United States Patent [19]

Bourdé

[11] 4,136,319
[45] Jan. 23, 1979

[54] FILTERING DEVICE FOR HIGH-VOLTAGE POWER LINES USED AS HIGH-FREQUENCY TRANSMISSION MEDIA

[75] Inventor: Michel Bourdé, Paris, France

[73] Assignee: CGEE Alstlom S.A., Levallois-Perret, France

[21] Appl. No.: 780,383

[22] Filed: Mar. 23, 1977

[30] Foreign Application Priority Data

Mar. 26, 1976 [FR] France ................. 76 08876

[51] Int. Cl.² .................. H03H 7/14; H03H 7/04; H04B 3/56
[52] U.S. Cl. .................. 333/1; 333/70 R; 340/310 R
[58] Field of Search ............ 333/1, 6, 70, 76, 79; 340/310 R, 310 A; 325/308, 379, 385

[56] References Cited

U.S. PATENT DOCUMENTS

| 1,469,832 | 10/1923 | Hamilton | 333/6 X |
| 2,860,324 | 11/1958 | Berger et al. | 340/310 R |
| 3,771,064 | 11/1973 | Herbert, Jr. | 333/70 R |

Primary Examiner—Craig E. Church
Assistant Examiner—Marvin Nussbaum
Attorney, Agent, or Firm—Sughrue, Rothwell, Mion, Zinn and Macpeak

[57] ABSTRACT

Telecommunications are conveyed between sub-stations of a high-voltage electricity distribution network by high-frequency carriers using the power lines as transmission media. The filtering device attenuates high frequencies spilling over from one line section to the next. Filter elements in series with the line are high-voltage units passing high currents and are therefore expensive. Coarse-tuned high-voltage filter elements include an HF drain path to earth. Fine-tuned low-voltage filter elements at the earth end of the Hf drain path prevent wanted signals from being lost.

6 Claims, 2 Drawing Figures

FILTERING DEVICE FOR HIGH-VOLTAGE POWER LINES USED AS HIGH-FREQUENCY TRANSMISSION MEDIA

The invention relates to improvements to the filtering devices for decoupling signals transmitted by carriers over high-voltage networks.

Electric power producers need a large number of data transmitting connections in order to ensure the proper working of their power stations and high-voltage distribution networks. Carrier technology is used to transmit this data which is necessary for the working of the network over the network lines. Thus, high-voltage power lines themselves are used as the transmission medium and are equipped for that purpose at low extra cost. These transmissions are frequency modulated and the carrier frequency lies between 40 and 400 kHz. The transmissions generally go from one sub-station to the next sub-station and a number of frequency bands lying between the abovementioned limits are ascribed to each line section connecting two sub-stations. As the traffic needs become very great, it is essential to use the same frequency bands several times on several different line sections in order to remain within the limits of the permitted frequencies. In this case, in order to avoid interference between traffic on the various line sections, two line sections using the same frequency bands must be separated from each other by two line sections and by three sub-station sets, so that the attenuation caused by these elements will be sufficient to avoid interference.

However, as the frequency congestion is very great, it is sometimes not possible to apply this rule and it is then necessary to form isolation sections with filters installed at both ends. The same frequency bands can thus be used on two line sections separated by only one line section and two sub-station sets; the line section in question being referred to as an isolation section and including a filter at each end. However, the use of a conventional T-section low pass filter to prevent any signals in the 40 kHz to 400 kHz range from leaking out of the isolation section requires enormous and very expensive inductances which are capable of passing a low frequency line current in the order of 3000 A.

The invention aims to enable the size of the inductances and hence the price of the filters to be reduced.

The present invention provides a filtering device for use at an end of an isolation section in a high-voltage electricity distribution network; the network comprising energy-transporting line sections which extend between sub-stations and which additionally perform the function of transmission media for high-frequency carrier-wave telecommunications between communication sets of adjacent ones of the sub-stations; the carrier-waves lying in a frequency range of $\Delta F$ which extends between a lower frequency f and an upper frequency F; the isolation section being one of said line sections over which telecommunications take place in n frequency bands lying within said frequency range $\Delta F$ and none of which n bands are used in any of the other line sections connected to the sub-stations of the said isolation section; the filtering device comprising:
- a blocking filter for connection in series between the end of a high-voltage line of the isolation section and the sub-station, said blocking filter comprising a series inductance with a parallel-connected tuning circuit and being adjusted to block frequencies in the lower part of said frequency range $\Delta F$;
- a capacitor with one terminal connected to the line side of said blocking filter;
- a drain coil connected in series between the other terminal of the capacitor and earth; and
- a selective filter assembly connected in parallel with said drain coil and adjusted to stop the said n frequency bands of the isolation section.

Thus all frequencies lying within the range $\Delta F$ and suitable for use in a line section outside the isolation section are prevented from entering the isolation section by the filtering device. Likewise the frequency bands lying in the frequency range $\Delta F$ and used within the isolation section are kept inside the isolation section.

Of course, such a device is placed at each end of the isolation section.

The use of the selective filtering assembly embodying the invention makes it possible to economize a band-stop filter on the line for cutting out the bottom of the frequency range $\Delta F$ which is not cut out by the second inductance and the capacitor. Such a filter would therefore be necessary without this filtering assembly which is very much less expensive than a filter installed on the high-voltage circuit. This therefore economizes the equivalent of an inductance of the order of 1.5 mH through which there passes a high current in the order of 3000 A.

An embodiment of the invention having no limiting character will be described with reference to the accompanying drawing in which:

FIG. 1 shows a network comprising eight sub-station sets: 1, 2, 3, 4, 5, 6, 7 and 8 connecting ten line sections: 9, 10, 11, 12, 13, 14, 15, 16, 17 and 18.

According to present known technology concerning the use of same frequency bands on different line sections it is known that such sections must be separated by two line sections and by three sets; thus, if a frequency f is used on the line 9, this same frequency can be used again on one of the lines 12, 13 and 18, for each of these lines is separated from the line 9 by at least two lines and three sets: lines 16, 14 and sets 1, 7 and 6, or else lines 10, 11 and sets 2, 3, 4.

It is seen in this network that line 17 is a great hindrance in the application of this rule, for it prevents the use of bands having the same frequencies on lines 16 and 11 for example or lines 10 and 14; it is therefore awkwardly placed. Now, if a filtering device embodying the invention is placed at both ends of the line 17, an isolation section is formed and the same frequency bands can be used on sections 16 and 11 or on sections 14 and 10.

In the network shown in this figure, the various sub-station sets have been connected together by a single line representing a single wire, but these can be double or triple wires and it is obviously an advantage to choose a single wire line as the isolation section in order to avoid multiplication of the number of filters which are placed on each of the three phases.

Figure 1:
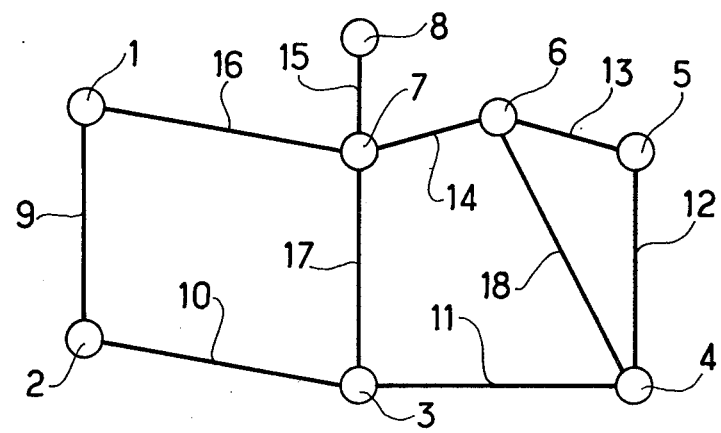
FIG. 1 is a diagram of an electricity network to show the advantage of having an isolation section.
Figure 2:
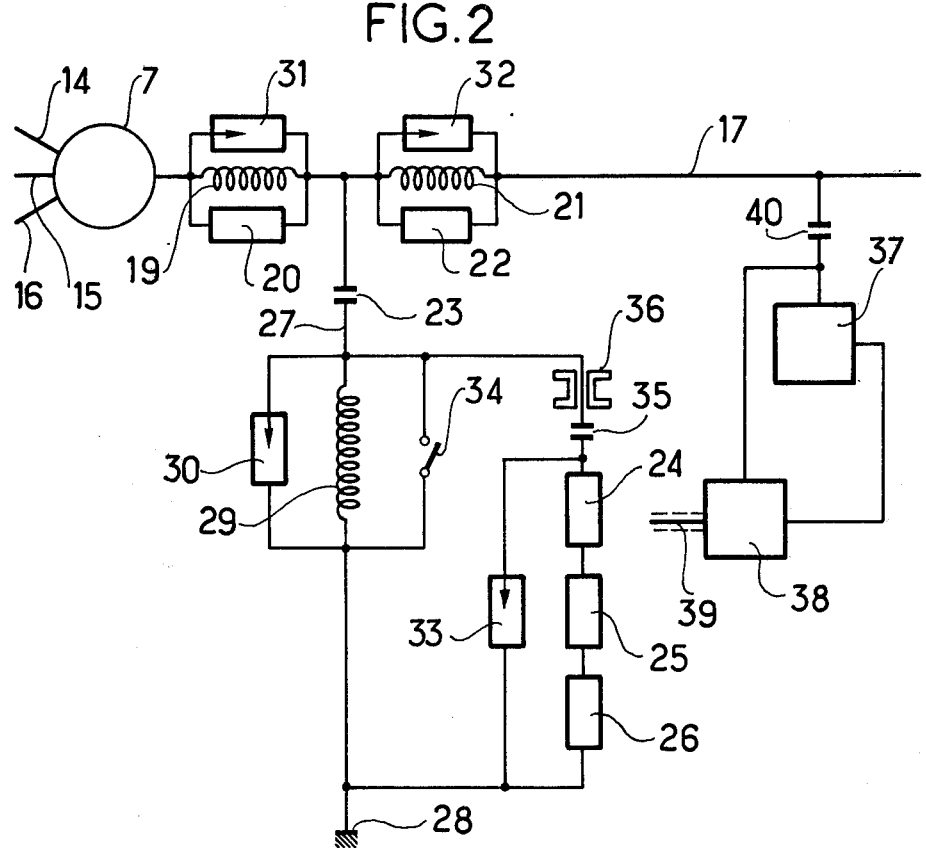
FIG. 2 is a circuit diagram of a filtering assembly embodying the invention.

On referring to FIG. 2, a part of line 17 will be seen from its end connected to the set of sub-station 7. A filtering device embodying the invention is placed on this end; it comprises a first filtering cell comprising an inductance 19 and a tuning circuit 20 in parallel with the inductance 19. This first cell is set to cut the lower part of the frequency range ΔF used for carrier transmission. As this range lies between 40 and 400 kHz approximately, the first cell cuts from approximately 40 to 150 kHz. The device comprises a second inductance 21 placed on the side of the inductance 19 opposite to the set 7 and possibly, but not necessarily, a tuning circuit 22 connected in parallel with the inductance 21. This second inductance is designed to give a sufficient attenuation from approximately 150 kHz to 400 kHz or more. One of the terminals of a capacitor 23 is connected between the two inductances.

The filter is designed to cause an attenuation of 30 to 50 dB in this frequency range ΔF.

Such a filter would be sufficient on its own if the capacitor 23 were not there, indeed, the first filtering cell and the second inductance 21 would be sufficient to block all the frequency bands of the range ΔF which might exist on the lines 14, 15, 16 outside the isolation section 17. But the presence of this capacitor 23 (whose other end can be considered as earthed for the time being) while being beneficial for the attenuation of those frequency bands which are used on the outside lines and which lie in the top part of the range ΔF (for example between 150 and 400 kHz) since it would earth these frequencies, is a disadvantage for those frequency bands which are used in the isolation section 17 and which lie in the lower part of the frequency range ΔF (for example between 40 and 150 kHz) which are not blocked by the inductance 21 since the capacitor would earth these frequency bands. This particular embodiment of the invention therefore also comprises a filtering assembly constituted by n band stop filters: (three in this particular case) 24, 25 and 26 disposed in series between the second terminal 27 of the capacitor 23 and earth 28. These n filters correspond to the n frequency bands used in the isolation section 17. It should be observed that there are in any case no such frequency bands in the immediately neighbouring line sections: 14, 15, 16, in compliance with the rules laid down.

Thus, those frequency bands used in the isolation section 17 which are not blocked by the inductance 21 are blocked both by the selective filters 24, 25, 26 and by the first filtering cell 19, 20. The device is completed by a drain coil 29 connected between the second terminal 27 of the capacitor 23 and earth 28; this coil has a very low impedance at the frequency of the power distribution network and a high impedance (greater than 5000 Ω) in the 40 to 400 kHz frequency range and above. This coil is protected by a lightening conductor 30 connected in parallel. Lightening conductors 31, 32 and 33 also protect respectively the inductances 19, 21 and the n series connected selective filters 24, 25 and 26.

An earthing switch 34 is connected in parallel with the drain coil 29, a coupling capacitor 35 is disposed at the head of the selective band stop filters 24, 25 and 26 after an isolator 36.

Of course, instead of series connecting band stop filters corresponding to the frequency bands used in the isolation section 17, band pass filters which correspond to the remaining bands which are not used in the isolation section 17 could be parallel connected.

A device allowing connections to be made by carrier currents on the high-voltage line 17 is shown on the right-hand side of this figure.

This device comprises a coupling capacitor 40, an outer protection assembly 37, and a transmission/reception assembly 38 fed via a coaxial cable 39 with the n frequency bands used in the section 17, of which there are three in the example of FIG. 2 corresponding to the bands stopped by the band stop filters 24, 25 and 26.

The device can be formed by existing systems and standardized for the coupling of the HF transmitter/receivers on power lines. The high-frequency filters 24, 25, 26 are produced by the same technology as switching filters currently used in carrier teletransmission.

The possibility of adjusting the selective HF filters 24, 25, 26 makes it possible for the device, when put into service, to eliminate any possible series resonances which could occur at some precise frequency because of the filtering capacitors. By adjusting the HF filters it is possible to eliminate this series resonance or to shift it onto a neighbouring band where it is not inconvenient.

The device enables the inductances 15 and 21 to be reduced in size. Since the current of the power network passes through these inductances they constitute the expensive elements of the decoupling filter, and hence the elements where reduction is of greatest advantage.

As has been set forth hereinabove, such a filtering device is placed on each of the three phases.

In the case where the frequency bands used within the isolation section have been chosen exclusively in the lower part of the frequency range allotted to teletransmission, the capacitor 23 could be used to inject these internal frequency bands, this making it possible to dispense with the coupling capacitor 40. In this case, the tuning circuit 22 of the inductance 21 could be eliminated, and so could even the inductance 21, with a suitable design of the inductance 19.

The device embodying the invention makes it possible by means of the drain coil 29 to minimize the components of the filter by the coexistence of high voltages at industrial frequency and of low voltages at teletransmission frequencies.

What is claimed is:

1. A filtering device for use at an end of an isolation section in a high-voltage electricity distribution network; the network comprising energy-transporting line sections which extend between sub-stations and which additionally perform the function of transmission media for high-frequency carrier-wave telecommunications between communications sets of adjacent ones of the sub-stations; the carrier-waves lying in a frequency range ΔF which extends between a lower frequency f and an upper frequency F; the isolation section being one of said line sections over which telecommunications take place in n frequency bands lying within said frequency range ΔF and none of which n bands are used in any of the other line sections connected to the sub-stations of the said isolation section; the filtering device comprising:
a blocking filter comprising an inductance for connection in series between the end of the isolation section and the sub-station, and a tuning circuit connected in parallel with the inductance and adjusted to block frequencies in the lower part of said frequency range ΔF;
a capacitor with one terminal connected to the isolation section side of said blocking filter;
a drain coil connected in series between the other terminal of the capacitor and earth; and
a selective filter assembly connected in parallel with said drain coil and adjusted to stop the said n frequency bands of the isolation section.

2. A filtering device according to claim 1 including a further inductance connected in series between the blocking filter and the line.

3. A filtering device according to claim 2 including a further tuning circuit connected in parallel with said further inductance.

4. A filtering device according to claim 1 wherein said filter assembly comprises n series connected band stop filters.

5. A filtering device according to claim 1 wherein said filter assembly comprises parallel connected band pass filters.

6. A filtering device according to claim 1 wherein said capacitor is used as a coupling capacitor for coupling said n frequency bands with a communications set proper to the line.

* * * * *